United States Patent

Bither, Jr.

[15] 3,655,348

[45] Apr. 11, 1972

[54] PALLADIUM PHOSPHIDE CHALCOGENIDES

[72] Inventor: Tom Allen Bither, Jr., Wilmington, Del.

[73] Assignee: E. I. du Pont de Nemours and Company, Wilmington, Del.

[22] Filed: Sept. 12, 1969

[21] Appl. No.: 857,560

[52] U.S. Cl. ..................................................23/315, 252/518

[51] Int. Cl. ................C01b 17/00, C01b 19/00, C01b 25/14

[58] Field of Search ....................................23/315; 252/518

[56] References Cited

OTHER PUBLICATIONS

Van Wazer, " Phosphorus and its Compounds," Volume I, pages 824–826 (1958).

*Primary Examiner*—M. Weissman

*Attorney*—D. R. J. Boyd

[57] ABSTRACT

At high pressures and temperatures in the vicinity of 1,000° C., palladium, phosphorus and a chalcogen, X, which can be S or Se combine to form compounds having the formula $PdP_yX_{2-y}$ in which $y$ is 0.67 when X is S and $y$ is 0.4 to 0.8 when X is Se and which have a pyrite-type crystal structure. The compounds $PdP_yX_{2-y}$ are electrical conductors with an essentially zero temperature coefficient of resistance from liquid helium temperature to room temperature. The compounds are useful as electrical resistors.

5 Claims, No Drawings

PALLADIUM PHOSPHIDE CHALCOGENIDES

FIELD OF THE INVENTION

This invention relates to novel electrically conducting materials. More particularly, this invention relates to novel palladium phosphide chalcogenides having a pyrite-type crystal structure and metallic conductivity.

BACKGROUND OF THE INVENTION

Binary dichalcogenides, e.g., $FeS_2$ and $CoSe_2$, and dipnictides, e.g., $NiP_2$ and $PtAs_2$, of pyrite-type crystal structure with the cubic symmetry Pa3 and four formula units per unit cell are known. Pyrite, $FeS_2$, for example, has a unit cell edge of about 5.41 A and a crystal structure designated as type C–2 in the "Strukturbericht" of the Zeitschrift for Kristallographie. Some ternary pnictide chalcogenides are also known. In U.S. Pat. No. 3,295,931, F. Hulliger describes ternary superconducting compounds of formula XYZ, where X is selected from Pd and Pt, Y is selected from Sb and Bi, and Z is selected from Se and Te and their preparation by heating mixtures of the elements at autogenous pressure for periods as long as one or two months at temperatures up to 500° C. The crystal structure of the XYZ compounds is not described in the patent, but the patentee reports in Comp. Rend. Soc. Suisse de Phys. 35, 535 (1962) that PdAsS, PdSbS, PdAsSe, PdSbSe, PdBiSe, PdSbTe, and PdBiTe have cobaltite-type structures. F. Hulliger further discusses the first six of the above compounds in Nature 198, 382 (1963) and reports that all crystallize in a cubic cobaltite-type, i.e., a pyrite-derivative-type, structure. F. Hulliger speculates in this latter article that metallic cobaltite-type phases, which are also expected to exist include, among others, the stoichiometric compounds PdPS and PdPSe.

U.S. Pat. applications Ser. Nos. 857,561 and 857,562 filed concurrently with this application, describe two new palladium phosphide chalcogenide compositions: $Pd_3Pd_2S_8$ of trigonal crystal symmetry, and semiconducting $PdPS_xSe_{1-x}$, wherein $x$ is 0–1 with orthorhombic crystal symmetry.

SUMMARY OF THE INVENTION

The present invention comprises compounds having the formula $$PdP_yX_{2-y}$$

wherein X is S or Se and $y$ is 0.67 when X is S and when X is Se, $y$ is 0.4 to 0.8 and preferably from 0.5 to 0.7.

The palladium phosphide chalcogenides of the invention are crystalline, have a pyrite-type crystal structure and are electrical conductors.

DETAILED DESCRIPTION OF THE INVENTION

The novel chalcogenides of the present invention may be prepared by heating a mixture of elementary Pd, P and one of S and Se in which the atomic ratio of P to Pd is at least 0.5, preferably 0.6–0.7, and the atomic ratio of S to P is greater than 1 and that of Se to P is at least about 1, preferably 1.8–2.4, for about 0.25–2 hours or more at 900°–1,300° C., preferably 1,000°–1,200° C., at pressures of about 65 kilobars (kbars) when the chalcogenide is S and at pressures of 25–65 kbars when the chalcogen is Se. Binary sulfides, selenides, and phosphides of palladium and binary sulfides and selenides of phosphorus may be substituted for stoichiometrically equivalent quantities of the reactant elements.

Although certain of the known metallic phosphide chalcogenides have an ordered arrangement of phosphide and chalcogenide anions and crystallize in a derivative structure of the pyrite-type structure (e.g., the ullmannite-type structure) with the cubic symmetry $P2_13$ and with four molecules per unit cell, the palladium phosphide chalcogenides of the present invention crystallize in the pyrite-type structure with the Pa3 symmetry and also with four molecules per unit cell.

Palladium phosphide sulfide of this invention crystallizes as $PdP_{0.67}S_{1.33}$, i.e., to a unique composition. This is shown by the constancy of its unit cell dimension ($a$ = 5.844 Å) when the ratio S:P in reactant mixtures is varied from 1.5:1 to 3:1, and the atomic ratio of Pd:P in reactant mixtures is varied from 1:1 to 1.5:1. Analytical and density data confirm the composition $PdP_{0.67}S_{1.33}$. In contrast, the isotypic palladium phosphide selenides are clearly not invariant in composition and the ratio of chalcogen to phosphorus varies within the described limits. Thus, unit cell dimensions of $a$ varying from about 6.056 to 6.13 Å are observed in $PdP_ySe_{2-y}$, prepared from different ratios of starting materials and at different temperatures and pressures. From density measurements, the composition $PdP_{0.59}Se_{1.41}$ may be calculated for $a$ = 6.056 Å.

The ratio of reactants used in preparing the sulfide, $PdP_{0.67}S_{1.33}$, is critical in that the ratio of S:P must be greater than unity to obtain the material in significant yield. Thus, at 65 kbars pressure, the sulfide may be obtained with the reactant Pd:P:S atomic ratios of the order of 1:1:1.5–3.0 and 1:0.67:1.33. Under the same conditions, however, atomic reactant ratios of Pd:P:S of 1:1:1 or 1:2:1, result principally in the stoichiometric PdPS of copending U.S. Pat. application Ser. No. 857,562 or a mixture of $PdP_2$ and PdPS respectively. The ratio of reactants is less critical in the case of $PdP_ySe_{2-y}$ and the selenide may be obtained employing atomic reactant ratios of P:P:Se of 1:1:1, 1:0.5:1.5, and 1:0.67:1.33–2.67. For both the sulfide and the selenides, however, the preferred reactant ratio expressed as atoms is $$Pd:P:X = 1:0.6-0.7:1.4-1.3.$$

Elemental forms of palladium, phosphorus, sulfur, and selenium are conveniently employed as reactants though palladium sulfides, e.g., $Pd_4S$, PdS, and $PdS_2$, palladium selenides, e.g., $Pd_4Se$, $Pd_{17}Se_{15}$, and $PdSe_2$, palladium phosphides, e.g., $PdP_2$ and $PdP_3$, and phosphorus sulfides and selenides, e.g., $P_4S_3$, $P_4S_{10}$, $P_4S_5$, $P_4S_7$, $P_2Se_3$, and $P_2S_5$ may also be used as reactants in conjunction with use of appropriate quantities of elementary reactants. Preparation of reactant mixtures is facilitated when finely divided reactants are employed. Use of pure reactants leads to products of higher purity. It is desirable to mix the reactants thoroughly, as, for example, by mortar and pestle or other mixing means, and to compress the mixture into small cylindrical pellets by a conventional press prior to placing the mixture in the tetrahedral anvil device for reaction.

Though reaction temperatures of 1,000°–1,200° C. are preferred, the temperature range may be extended to 900°–1,300° C. The time of heating at maximum pressure is not critical. Usually 0.25 to 2 hours suffices. Gradual reduction in temperature after reaction, e.g., at a rate of about 25°–250° C. per hour to about 400° C., usually favors increased crystal size of the products. Optionally, the temperature may be lowered very rapidly to room temperature, e.g., in a few seconds, a procedure referred to hereinafter as quenching. In the tetrahedral anvil, it is convenient to maintain pressure until the product has reached room temperature.

High pressure is necessary to produce the products of this invention. Thus, the sulfur-containing phase $PdP_{0.67}S_{1.33}$ is obtained at 65 kbars pressure but little or none of the material is formed at 40 kbars pressure. Dependent upon the starting stoichiometry of the reactants, the selenide-containing phases $PdP_ySe_{2-y}$ may be prepared over a wider range of pressure. Though not formed in significant quantity at pressures as low as 20 kbars, traces of the $PdP_ySe_{2-y}$ of the invention may be detected in reactions conducted at 25 kbars and good yields are obtained at 40–65 kbars pressure.

The high pressures at which these reactions are carried out may be obtained, as in the examples that follow, by using a tetrahedral anvil pressure device as described by E. C. Lloyd et al., Jour. of Res., National Bureau of Standards 63C, 59 (1959). In this device, the reactants are placed in a boron nitride container which fits in a graphite sleeve that serves as a resistance heater. This assembly is enclosed in a pyrophyllite tetrahedron and is placed in the anvil device which is capable of generating pressures in excess of 65 kbars. The four calibration points used to determine pressure developed in this device appear in the 1963 Edition of the American Institute of Physics Handbook, Part 4, p. 43, as follows:

Bismuth I → II   25.37 ± 0.02 kbars

Bismuth II → III 26.96 ± 0.18 kbars
Thallium II → III 36.69 ± 0.11 kbars
Barium II → III 59.0 ± 1.0 kbars All compressions were made on the cold assembly and the charges were then heated to the desired temperature using an appropriate thermocouple. No pressure correction for thermocouple behavior has been introduced, standard emf tables for 1 atmosphere being employed. The pressure unit is a bar, equivalent to $10^6$ dynes/cm$^2$. The larger unit, a kilobar, equal to 1,000 bars, is used herein.

SPECIFIC EMBODIMENTS OF THE INVENTION

This invention is further illustrated by the following examples which are not, however, intended to fully delineate the scope of this discovery.

EXAMPLE 1

Reaction of Pd:P:S in a 1:1:2 atom ratio at a pressure of 65 kbars and a temperature of 1,200° C.

A 0.505-g. pellet made from a mixture of 0.426 g. of Pd, 0.124 g. of P, and 0.257 g. of S was pressured to 65 kbars in a tetrahedral anvil and heated to 1,200° C. in 1 hour, held 1 hour at 1,200° C., slowly cooled over a 4-hour period to 400° C., and quenched to room temperature. The resultant crystalline mass was extracted initially with carbon disulfide to remove any unreacted sulfur and subsequently with acetone and then with an acetic acid/acetone/water mixture to remove any soluble impurities. The majority of the product then consisted of small crystals plus a few larger crystals of different-appearing habit. These latter crystals were demonstrated by their X-ray diffraction powder pattern to be the orthorhombic PdPS phase described in copending U.S. Pat. application Ser. No. 857,562

The smaller crystals isolated from this reaction product gave a Debye-Scherrer X-ray diffraction powder pattern that is listed in Table I.

TABLE I

X-RAY DIFFRACTION POWDER PATTERN OF $PdP_{0.67}S_{1.33}$ PYRITE-TYPE PHASE

| Intensity* | h | k | l | d Spacing, A |
|---|---|---|---|---|
| 85 | 1 | 1 | 1 | 3.3870 |
| 90 | 2 | 0 | 0 | 2.9315 |
| 45 | 2 | 1 | 0 | 2.6204 |
| 45 | 2 | 1 | 1 | 2.3913 |
| 90 | 2 | 2 | 0 | 2.0702 |
| 10 | 2 | 2 | 1 | 1.9535 |
| 100 | 3 | 1 | 1 | 1.7644 |
| 60 | 2 | 2 | 2 | 1.6889 |
| 25 | 3 | 2 | 0 | 1.6224 |
| 30 | 3 | 2 | 1 | 1.5632 |
| 10 | 4 | 0 | 0 | 1.4622 |
| 5 | 4 | 1 | 0 | 1.4180 |
| 60 | 3 | 3 | 1 | 1.3419 |
| 50 | 4 | 2 | 0 | 1.3077 |
| 5 | 4 | 2 | 1 | 1.2767 |
| 5 | 3 | 3 | 2 | 1.2464 |
| 70 | 4 | 2 | 2 | 1.1937 |
| 60 | 5 | 1 | 1 | 1.1251 |
| 10 | 5 | 2 | 0 | 1.0859 |
| 10 | 5 | 2 | 1 | 1.0679 |
| 25 | 4 | 4 | 0 | 1.0332 |
| 30 | 5 | 3 | 1 | 0.9878 |
| 25 | 6 | 0 | 0 | 0.9742 |
| 5 | 6 | 1 | 1 | 0.9485 |
| 10 | 6 | 2 | 0 | 0.9242 |
| 2 | 6 | 2 | 1 | 0.9125 |
| 20 | 5 | 3 | 3 | 0.8913 |
| 15 | 6 | 2 | 2 | 0.8812 |
| 5 | 4 | 4 | 4 | 0.8434 |
| 5 | 6 | 3 | 2 | 0.8352 |
| 70 | 7 | 1 | 1 | 0.8184 |
| 70 | 6 | 4 | 0 | 0.8104 |
| 10 | 7 | 2 | 0 | 0.8027 |
| 5 | 7 | 2 | 1 | 0.7953 |
| 50 | 6 | 4 | 2 | 0.7810 |

*An intensity value of 100 is assigned to the strongest line of the pattern.

This powder pattern may be indexed on the basis of a primitive cubic cell of edge length *a* x 5.844 A. The relative intensities of the stronger lines of this pattern approximately match the intensities of the lines of the powder patterns of such known compounds as $NiS_2$ and $PtP_2$ which have the $FeS_2$ pyrite-type of structure. This powder pattern also has the proper systematic absences for the Pa3, pyrite-type, space group. These data establish the isotypism of the palladium phosphide sulfide product of this example and pyrite, $FeS_2$.

The crystalline material of this example having the pyrite-type of structure was found by elemental analysis to contain 12.4 percent phosphorus (theory for $PdP_{0.67}S_{1.33}$: 11.95% P). In view of this analysis and the approximate anion to cation atom ratio of 2:1 for pyrite-type compositions, the formula $PdP_{0.67}S_{1.33}$ is indicated.

Four probe resistivity measurements on a single crystal of the pyrite-type phase showed it to be metallic with an essentially invariant resistivity from liquid helium temperature ($\rho_{4.2°K} = 1.7 \times 10^{-4}$ ohm-cm) to room temperature ($\rho_{298°K} = 2.0 \times 10^{-4}$ ohm-cm). By application of the Meissner technique [W. Meissner & R. Ochsenfeld, Naturwissenshaften, 21, 787 (1933)], the onset of a superconducting transition was observed to take place in this material at 1.25°K, the lowest temperature of measurement.

EXAMPLE 2

Reaction of Pd:P:S in a 1:1:3 atom ratio at a pressure of 65 kbars and a temperature of 1,200° C.

A 0.458-g. pellet made from a mixture of 0.372 g. of Pd, 0.108 g. of P, and 0.337 g. of S was pressured to 65 kbars in a tetrahedral anvil and heated for 2 hours at 1,200° C., slowly cooled in 4 hours to 400° C., and quenched to room temperature. The resultant product comprised large, dark crystals in the center and small, silvery crystals at the ends of the sample. The bulk of this material was unidentified, but a Debye-Scherrer X-ray diffraction powder pattern on material from the sample ends indicated a portion of it to be the pyrite-type palladium phosphide sulfide phase of Example 1 with an approximate cell dimension *a* x 5.84 A.

EXAMPLE 3

Reaction of Pd:P:S in a 1:1:2 atom ratio at a pressure of 65 kbars and a temperature of 1,000° C.

A 0.519-g. pellet made from a mixture of 1.065 g. of Pd, 0.310 g. of P, and 0.643 g. of S was pressured to 65 kbars in a tetrahedral anvil and heated for 2 hours at 1,000° C., slowly cooled in 4 hours to 400° C., and quenched to room temperature. The resultant product, which consisted of a mixture of small silvery crystals plus larger, dark, conchoidally shaped pieces, was extracted with warm water and acetone to remove any soluble impurities. A Debye-Scherrer X-ray diffraction powder pattern taken upon the silvery crystals, after deletion of a few weak lines corresponding to the orthorhombic PdPS of copending U.S. Pat. application Ser. No. 857,562 was the same as that of the product of Example 1, indicating this material to be the pyrite-type palladium phosphide sulfide with cubic cell dimension *a* x 5.844 A.

Elemental analyses on this pyrite-type material indicated an atom ratio of S:P = 1.95:1, which within the limits of experimental error is in good agreement with the formula $PdP_{0.67}S_{1.33}$.

EXAMPLE 4

Reaction of Pd:P:S in a 1:1:1.5 atom ratio at a pressure of 65 kbars and a temperature of 1,000° C.

A 0.553-g pellet made from a mixture of 1.170 g. of Pd, 0.341 g. of P, and 0.529 g. of S was reacted and then extracted with water and acetone in the manner of Example 3. The resultant product consisted of small silvery crystals at the center of the sample with larger crystals (orthorhombic PdPS) adjacent thereto.

A Debye-Scherrer X-ray diffraction powder pattern taken upon the small crystals from the center of the sample was the same as that of the product of Example 1, indicating this material to be the pyrite-type palladium phosphide sulfide with cubic cell dimension $a = 5.844$ A. Elemental analyses on this phase indicated an atom ratio of S:P = 2.14:1, which within the limits of experimental error is in good agreement with the formula $PdP_{0.67}S_{1.33}$.

EXAMPLE 5

Reaction of Pd:P:S in a 1:0.67:1.33 atom ratio at a pressure of 65 kbars and a temperature of 1,000° C.

A 0.564-g. pellet made from a mixture of 1.277 g. of Pd, 0.248 g. of P, and 0.513 g. of S was reacted and then extracted with water and acetone in the manner of Example 3. The resultant product consisted of silvery crystals. A Debye-Scherrer X-ray diffraction powder pattern taken upon these crystals was the same as that reported in Table I, indicating this material to be the pyrite-type palladium phosphide sulfide with cubic cell dimension $a = 5.844$ A.

The measured density of crystals of this material was 5.66 g./cm$^3$. The density calculated for 4 molecules of the formula $PdP_{0.67}S_{1.33}$ having the pyrite-type structure with $a = 5.844$ A is 5.65 g./cm$^3$, in good agreement with the observed value.

In confirmation of the metallic properties of this pyrite-type phase as described in Example 1, a portion of the $PdP_{0.67}S_{1.33}$ phase was incorporated in series into an electrical circuit containing a 3-volt light bulb and a 3-volt d.c. power source. Upon closing the circuit, the bulb lighted brightly, indicating the excellent conductivity of the material.

Magnetic susceptibility measurements indicated this pyrite-type material to be Pauli paramagnetic with a temperature independent value of $\chi_g = 0.20 \times 10^{-6}$ emu/g over the measured range 77°–300° K. This observed Pauli paramagnetism is in accord with the metallic properties noted above and in Example 1.

EXAMPLE 6

Reactions of Pd:P:Se in a 1:1:1 atom ratio at pressures of 65 and 40 kbars and a temperature of 1,000° C.

A. A 0.706-g. pellet made from a mixture of 1.278 g. of Pd, 0.373 g. of P, and 0.948 g. of Se was reacted in the manner of Example 3. A fragile polycrystalline boule resulted that comprised silvery crystals in the center and a mixture of both silvery and golden crystals at the ends.

The silvery crystals isolated from this reaction product gave the Debye-Scherrer X-ray diffraction powder pattern listed in Table II, that could be indexed in the manner of Example 1 on the basis of a cubic, pyrite-type structure with cell dimension $a = 6.056$ A. The gold crystals were identified by their X-ray diffraction powder pattern as being the known $PdP_2$ of monoclinic symmetry. The presence of some $PdP_2$ in the reaction product prepared from a starting atom ratio of Pd:P:Se = 1:1:1 indicates that the pyrite-type phase described above has a stoichiometry in which the ratio of Se to P is greater than unity, i.e., $PdP_ySe_{2-y}$, where $0 < y < 1$ (e.g., $3Pd + 3P + 3Se$ $PdP_2 + 2PdP_{0.5}Se_{1.5}$).

The measured density of the silvery crystals was 7.06 g./cm$^3$. On the basis of this measured density, the unit cell dimension of 6.056 A, and the fact that there are four molecules of $MX_2$ or MXY in the pyrite unit cell, the specific formula $PdP_{0.59}Se_{1.41}$ is obtained for this palladium phosphide selenide, in accord with the general formula indicated above. The selenium to phosphorus ratio greater than unity is analogous to that observed in the sulfur-containing, pyrite-type palladium phosphide sulfides of Examples 1–5.

To demonstrate the metallic property of this pyrite-type palladium phosphide selenide phase, a portion of the sample was incorporated in series into an electrical circuit containing a 3-volt light bulb and 3-volt d.c. power source. Upon closing the circuit, the bulb lighted brightly, indicating the excellent conductivity of this material.

TABLE II

X-RAY DIFFRACTION POWDER PATTERN OF $PdP_{0.59}Se_{1.41}$ PYRITE-TYPE PHASE

| Intensity* | h | k | l | d Spacing, A |
|---|---|---|---|---|
| 35 | 1 | 1 | 1 | 3.4938 |
| 100 | 2 | 0 | 0 | 3.0269 |
| 70 | 2 | 1 | 0 | 2.7071 |
| 70 | 2 | 1 | 1 | 2.4711 |
| 60 | 2 | 2 | 0 | 2.1395 |
| 5 | 2 | 2 | 1 | 2.0202 |
| 100 | 3 | 1 | 1 | 1.8252 |
| 25 | 2 | 2 | 2 | 1.7471 |
| 40 | 3 | 2 | 0 | 1.6789 |
| 50 | 3 | 2 | 1 | 1.6183 |
| 2 | 4 | 1 | 0 | 1.4676 |
| 20 | 3 | 3 | 1 | 1.3887 |
| 25 | 4 | 2 | 0 | 1.3539 |
| 15 | 4 | 2 | 1 | 1.3208 |
| 10 | 3 | 3 | 2 | 1.2902 |
| 15 | 4 | 2 | 2 | 1.2358 |
| 50 | 5 | 1 | 1 | 1.1648 |
| 15 | 5 | 2 | 0 | 1.1237 |
| 10 | 5 | 2 | 1 | 1.1057 |
| 30 | 4 | 4 | 0 | 1.0700 |
| 10 | 5 | 3 | 1 | 1.0230 |
| 20 | 6 | 0 | 0 | 1.0094 |
| 5 | 6 | 1 | 0 | 0.9959 |
| 15 | 6 | 1 | 1 | 0.9819 |
| 10 | 6 | 2 | 0 | 0.9578 |
| 5 | 6 | 2 | 1 | 0.9363 |
| 15 | 5 | 3 | 3 | 0.9240 |
| 5 | 7 | 1 | 1 | 0.8477 |
| 20 | 6 | 4 | 0 | 0.8397 |
| 10 | 7 | 2 | 0 | 0.8319 |
| 10 | 7 | 2 | 1 | 0.8241 |
| 15 | 6 | 4 | 2 | 0.8091 |
| 25 | 7 | 3 | 1 | 0.7885 |

*Intensity values of 100 are assigned to the strongest lines of the pattern.

B. A 0.725-g. pellet of the starting materials used in Part A of this Example was reacted in the same manner but at a pressure of 40 kbars. The resultant crystalline product, as determined from its Debye-Scherrer X-ray diffraction powder pattern, consisted of a mixture of a pyrite-type phase of cell dimension $a = 6.110$ A and the known $PdP_2$ phase of monoclinic symmetry. As discussed above, a composition $PdP_ySe_{2-y}$ is thus indicated for this pyrite-type phase. Since the unit cell dimension differed from that of the product prepared at 65 kbars, an essentially invariant ratio of chalcogen to P does not hold for the selenide-containing pyrite-type ternaries as was true of the sulfide-containing pyrite-type ternary in which $a = 5.844$ A.

EXAMPLE 7

Reaction of Pd:P:Se in a 1:1:1 atom ratio at a pressure of 65 kbars and a temperature of 1,200° C.

A 0.688-g. pellet made from a mixture of 0.511 g. of Pd, 0.149 g. of P, and 0.379 g. of Se was reacted in the manner of Example 1. The resultant crystalline product, as determined from its Debye-Scherrer X-ray diffraction powder pattern in the manner of Example 6, consisted of a mixture of a pyrite-type $PdP_ySe_{2-y}$ phase of cell dimension $a = 6.064$ A and the known $PdP_2$ phase of monoclinic symmetry.

EXAMPLE 8

Reaction of Pd:P:Se in a 1:0.5:1.5 atom ratio at a pressure of 65 kbars and a temperature of 1,000° C.

A 0.738-g. pellet made from a mixture of 0.798 g. of Pd, 0.166 g. of P, and 0.888 g. of Se was reacted in the manner of Example 3. The resultant crystalline product, as determined from its Debye-Scherrer X-ray diffraction powder pattern consisted of a mixture of pyrite-type palladium phosphide selenide phases of cell dimensions $a = 6.078$ A and $a = 6.065$ A plus a minor amount of unidentified crystalline material.

EXAMPLE 9

Reactions of Pd:P:Se in a 1:0.67:1.33 atom ratio at pressures of 65 and 45 kbars and a temperature of 1,000° C.

Pellets weighing 0.735 g. and 0.728 g. and made from a mixture of 1.277 g. of Pd, 0.248 g. of P, and 1.263 g. of Se were reacted, respectively, at pressures of 65 and 45 kbars in the manner of Example 3. Silvery, crystalline products were isolated from each reaction. As determined from their Debye-Scherrer x-ray diffraction powder patterns, the product prepared at 65 kbars consisted of a pyrite-type palladium phosphide selenide of cell dimension $a = 6.057$ A plus a minor amount of unidentified crystalline material, and the product prepared at 45 kbars consisted of a pyrite-type palladium phosphide selenide of cell dimension $a = 6.079$ A plus a minor amount of the orthorhombic-like PdPSe described in copending U.S. Pat. application Ser. No. 857,562.

EXAMPLE 10

Reaction of Pd:P:Se in a 3:2:8 atom ratio at a pressure of 25 kbars and a temperature of 1,000° C.

A 0.672-g. pellet made from a mixture of 0.958 g. of Pd, 0.186 g. of P, and 1.895 g. of Se was reacted in the manner of Example 3. The resultant silvery, crystalline product, as determined from its Debye-Scherrer X-ray diffraction powder pattern consisted primarily of the orthorhombic-like PdPSe phase of Example 9 but also contained some of the pyrite-type palladium phosphide selenide phase having a cell dimension $a$ of approximately 6.13 A.

As described in Examples 1, 5, and 6, palladium phosphide chalcogenides of the formula $PdP_yX_{2-y}$, wherein X is S or Se and $y$ is 0.67 when X is S and when X is Se, $y$ is 0.4-0.8, exhibit metallic properties and are good conductors of electricity with an essential invariance in resistivity from liquid helium temperature to room temperature as shown in Example 1. As a consequence of this latter property, these materials are useful as electrical resistor compositions. Such compositions can be prepared by making slurries of these palladium phosphide chalcogenides in finely divided form in convenient vehicles such as water, alcohols, esters, and the like and subsequently applying these slurries to the desired insulating substrate by such conventional techniques as spraying, stenciling, brushing, and the like. Solvents may then be removed by conventional drying techniques employing an inert atmosphere if desired.

I claim:

1. A composition of matter having the formula $$PdP_yX_{2-y}$$

wherein X is S or Se; and when X is S, $y$ is 0.67 and when X is Se, $y$ is from 0.4 to 0.8, said composition having a pyrite-type crystal structure with Pa3 symmetry, metallic conductivity, and when X is S having a Debye-Scherrer X-ray diffraction powder pattern with the lines shown in Table I of the specification.

2. The compound of claim 1 wherein X is S

3. The composition of matter of claim 1 wherein X is Se.

4. The compound of claim 3 wherein y is 0.5 to 0.7.

5. The composition of matter $PdP_{0.59}Se_{1.41}$ having a pyrite-type crystal structure.

* * * * *